Patented Mar. 18, 1930

1,750,938

UNITED STATES PATENT OFFICE

WILLIAM B. NEWKIRK, OF WESTERN SPRINGS, ILLINOIS, ASSIGNOR TO INTERNATIONAL PATENTS DEVELOPMENT COMPANY, OF WILMINGTON, DELAWARE, A CORPORATION OF DELAWARE

MANUFACTURE OF DEXTROSE

No Drawing. Application filed August 6, 1924, Serial No. 730,374. Renewed June 20, 1929.

My invention relates to the manufacture of granular or crystalline dextrose hydrate, that is, dextrose hydrate consisting of separate, naturally formed crystals in a state of high purity, such, for example, as is producible by the methods described in my Patent No. 1,471,347, Oct. 23, 1923, and in application Serial No. 705,780, filed April 11, 1924 (continuation filed September 10, 1924, Serial No. 726,945 patented June 16, 1925 as No. 1,521,830). The first named patent describes a method whereby a high purity, granular dextrose may be produced under certain regulated conditions by the use of a relatively small amount of solid phase as seed; whereas the application referred to (Patent 1,521,830) describes certain improvements on the method of the previous application involving a transfer from batch to batch successively of such relatively large quantities of solid phase dextrose, mixed with mother liquor (the mixture being known as "foots") that the solid phase becomes a significant or perhaps dominant factor in controlling crystallization of dextrose from the solution. The present invention involves a novel application of a principle of control, allied to but somewhat different from the above mentioned principle of control by maintenance of large quantities of solid phase dispersed throughout the supersaturated solution, whereby instead of maintaining the control throughout the process by means of the large quantities of previously formed crystals to produce in one crystallizing operation a completely purgable magma which may not be practical (the "second hydrol" used for the "third sugar" of Patent 1,471,347) crystallization is brought about in an imperfect manner, if need be, and the product is then melted but incompletely so as to leave in the solution some of the crystals, necessarily the normal, fully formed crystals, since the smaller, less resistant, false grain will melt first, whereupon, on supersaturation of the solution the solid phase allowed to remain therein will control the process of crystallization so as to give, as I discovered, a completely purgable magma.

This principle of operation may be used in various ways for the production of a high purity crystalline dextrose hydrate. For instance, as suggested above, it may be employed for producing such product from a relatively impure dextrose such as the third sugar of my Patent 1,471,347 which may have a purity no higher than 96%. This method may be described as follows:

For the manufacture of hydrate dextrose the third sugar for example, of Patent 1,471,347, or other such impure hydrate, is partially but not completely melted by the application of heat with or without water or light dextrose liquor. Some of the crystals are left in the solution. This magma is then crystallized at hydrate temperatures (below 120° F. and preferably about 105° F. or lower) in a crystallizer having an agitator so that the crystals are kept dispersed throughout the magma, and on centrifuging one will have a pure hydrate sugar. My theory as to this matter is that in the first place the solid phase left unmelted in the solution which is of the hydrate form tends to overcome by its influence the general tendency of pure solutions to crystallize as anhydride; and, in the second place the melted hydrate has not had time to change from alpha to an equilibrium between alpha and beta dextrose. While still in the alpha state the dextrose tends, apparently, to crystallize as hydrate, whereas after some time has elapsed the dissolved hydrate changes from the alpha to the state above noted and it is in this state that dextrose in pure and completely melted solutions tends to crystallize as the anhydride.

While I have described my invention in accordance with the practices which I deem preferable I contemplate the possibility of modifications which, moreover, will be found necessary in some cases to adapt the invention to manufacturing conditions different from those under which my work has been done. Such modifications will be within the capacity of the skilled worker. I have not mentioned the densities of the solutions to be crystallized. The densities will be substantially as set forth in my prior patent above specified, temperatures varying with density as therein stated. By the term "separate naturally formed crystals" I do not mean to exclude multiform crystals produced either by twinning or by the growth or crystals together to form single, hard, compact granules of a sort to withstand the forces exerted when the magma of crystals and mother liquor is centrifuged and permit the spinning out of the mother liquor from the mass. I mean, however, to exclude interlaced clusters of crystals of needle-like or flake-like character particularly, which are formed when the crystallizing operation is not properly controlled and which by breaking down in the centrifugal machine prevent the complete purging of the mother liquor from the crystalline dextrose. I have referred particularly, by way of example, to the treatment of the "third sugar" as described in Patent 1,471,347 above referred to. This third sugar is produced by bringing about crystallization of the dextrose in the hydrol or mother liquor derived from the second crystallizing operation, as described in the patent, which second crystallizing operation utilizes the hydrol or mother liquor from the first crystallizing operation to which the liquor from the converters is subjected. This third sugar is taken as an example because it is likely to contain impurities in amount making it undesirable to market the product, as stated in said patent. However, the method of the present invention is applicable at any stage of the process of crystallizing dextrose hydrate from a solution where a mass of crystals, or mass of crystals and non-dextrose substances, is produced which is not capable of centrifuging so as to give the high purity desired in the final product.

I do not claim herein the application of the principle described to the manufacture of anhydrous dextrose as that is made the subject matter of a copending application filed January 17, 1925, Serial No. 3,105, in which the generic invention is claimed. The present application is limited to the production of dextrose hydrate.

I claim:

1. Method of making crystalline dextrose hydrate which comprises incompletely melting the solid hydrate dextrose having a purity above ninety percent so as to leave some of the substance in the solid phase, and inducing crystallization of hydrate dextrose by supersaturation without the addition of seed crystals and with the magma in motion.

2. Method of making crystalline dextrose hydrate which comprises incompletely melting solid hydrate dextrose having a purity above ninety percent so as to leave some of the substance in the solid phase and inducing crystallization of hydrate dextrose by supersaturation without the addition of seed crystals and with the magma in motion at a temperature below 120° F.

3. Improvement in the method of producing a high purity granular dextrose from a solid dextrose of relatively low purity and predominantly of the hydrate type which consists in partially melting the solid impure dextrose so as to leave some of it in pure the solid phase, bringing about supersaturation of this magma to produce crystallization in the form of separate, naturally formed crystals, and removing the mother liquor from the crystals while the magma is in a fluent condition.

4. Improvement in the method of producing a high purity granular dextrose from a low purity solid dextrose predominantly of the hydrate type which consists in partially melting the solid impure dextrose so as to leave some of it in the solid phase, bringing about supersaturation of this magma within a range of temperatures favorable to the production of the hydrate type of crystals, and after crystallization has taken place, removing the mother liquor from the crystals while the magma is in a fluent condition.

5. Improvement in the method of producing a high purity granular dextrose from a solid hydrate dextrose of relatively low purity which consists in partially melting the solid impure dextrose so as to leave some of it in the solid phase, bringing about supersaturation of this magma to produce crystallization of hydrate dextrose, and removing the mother liquor from the crystals while the magma is in a fluent condition.

6. Improvement in the method of producing a high purity granular dextrose from a solid hydrate dextrose of relatively low purity which consists in partially melting the solid impure dextrose so as to leave some of it in the solid phase, bringing about supersaturation of this magma to produce crystallization of hydrate dextrose while maintaining the solid phase dispersed throughout the liquid and maintaining the temperature favorable to the production of the hydrate crystals, and removing the mother liquor from the crystals while the magma is in a fluent condition.

7. Method of treating solid dextrose of relatively low purity containing crystals of dextrose hydrate for the production of a purer product in the form of separate, naturally formed crystals which consists in partially melting the impure dextrose so as to leave unmelted a body of solid phase of predominantly the hydrate type and bringing about supersaturation of this magma to produce the formation of crystals of the same crystalline type as the unmelted solid phase while maintaining the solid phase dispersed throughout the liquid, and removing the mother liquor from the crystals while the magma is in a fluent state.

8. Method of treating solid hydrate dextrose of relatively low purity for the production of a purer product in the form of separate, naturally formed crystals which consists in partially melting the impure dextrose so as to leave some of it in the solid phase, bringing about supersaturation of this magma to produce crystallization while maintaining the solid phase dispersed throughout the liquid so that the crystallized substance is in the form of separate, naturally formed crystals and maintaining a temperature favorable to the production of hydrate crystals, and when the crystallization is complete but while the magma is in a fluent state, centrifuging the magma to remove the mother liquor from the crystals.

9. Method of producing a high purity crystalline dextrose hydrate from a starch converted dextrose solution which comprises bringing about crystallization of the dextrose in such solution to give a predominantly hydrate product, heating such product so as to melt some of the crystals while leaving enough of the solid phase hydrate to control subsequent crystallization, and then supersaturating this magma to produce crystallization.

10. Method of producing a high purity crystalline dextrose hydrate from a starch converted dextrose solution which comprises bringing about crystallization of the dextrose in such solution to give a predominantly hydrate product, heating such product so as to melt some of the crystals while leaving enough of the solid phase hydrate to control subsequent crystallization, then supersaturating this magma to produce crystallization while maintaining the solid phase dispersed throughout the magma, and removing the mother liquor from the crystals while the magma is in a fluent state.

11. Method of producing a high purity, crystalline dextrose hydrate from a starch converted dextrose solution, which comprises bringing about crystallization of the dextrose in such solution to give a predominantly hydrate product, making a partial separation as between the dextrose and mother liquor, melting the dextrose but incompletely so as to leave enough of the hydrate crystals in the solution to control subsequent crystallization, supersaturating this magma to produce crystallization while maintaining the solid phase dispersed throughout the magma, and removing the mother liquor from the crystals while the magma is in a fluent state.

12. Improvement in the method of treating mixtures of predominantly hydrate crystallized dextrose and impurities incapable of complete purgation by centrifuging for the production of a high purity, crystalline dextrose, which consists in incompletely melting the dextrose so as to leave enough of it in the solid phase to control subsequent crystallization, subjecting the magma so produced to a second crystallizing operation and then removing the mother liquor from the crystals.

13. Improvement in the method of treating mixtures of predominantly hydrate crystallized dextrose and impurities incapable of complete purgation by centrifuging for the production of a high purity, crystalline dextrose, which consists in incompletely melting the dextrose so as to leave enough of it in the solid phase to control subsequent crystallization, subjecting the magma so produced to a second crystallizing operation while maintaining the solid phase dispersed throughout the magma, and centrifuging the magma while in a fluent state to remove the mother liquor from the crystals.

14. Method of making a high purity hydrate crystalline dextrose from a starch converted dextrose solution which comprises crystallizing the dextrose in solution to give a solid product predominantly hydrate, partially melting the solid dextrose so as to eliminate crystals of the non-purgable type and leave a body of hydrate crystals to control subsequent crystallization, crystallizing this magma while keeping the solid phase in dispersion, and then extracting the mother liquor from the crystals.

WILLIAM B. NEWKIRK.